United States Patent [19]

Sartorius

[11] 3,946,610

[45] Mar. 30, 1976

[54] TEMPERATURE MEASURING DEVICE FOR METALLURGICAL FURNACES

[75] Inventor: Guy Sartorius, Ban-Saint-Martin, France

[73] Assignee: Societe des Aciers Fins de l'Est, Boulogne-Billancourt, France

[22] Filed: July 30, 1974

[21] Appl. No.: 493,199

Related U.S. Application Data

[63] Continuation-in-part of Ser. No. 369,356, June 12, 1973.

[30] Foreign Application Priority Data

Oct. 5, 1973    France .............................. 73.35725

[52] U.S. Cl. ................... 73/343 R; 73/359; 74/405; 136/234
[51] Int. Cl.² ...................... G01K 1/14; F16H 57/00
[58] Field of Search .......................... 73/343 R, 359; 136/231–235; 74/405

[56] References Cited
UNITED STATES PATENTS

| 552,410 | 12/1895 | Brown ............................ 74/405 UX |
| 2,576,514 | 11/1951 | Bianco et al. ..................... 136/234 X |
| 2,898,771 | 8/1959 | Faulkner .......................... 74/207 X |
| 2,971,041 | 2/1961 | France ......................... 73/343 R X |
| 3,090,233 | 5/1963 | Shields et al. ..................... 73/343 R |
| 3,217,543 | 11/1965 | Van Haagen ..................... 73/359 X |
| 3,496,943 | 2/1970 | Mueller et al. .................... 74/207 X |
| 3,647,560 | 3/1972 | Truppe et al. .................... 73/359 X |
| 3,717,034 | 2/1973 | Dukelow et al. ................... 73/343 R |
| 3,763,704 | 10/1973 | Blau et al. ........................... 73/359 |

Primary Examiner—Richard C. Queisser
Assistant Examiner—Frederick Shoon
Attorney, Agent, or Firm—Beveridge, DeGrandi, Kline & Lunsford

[57] ABSTRACT

A system for measuring the temperature of the walls of a metallurgical furnace employs a temperature measuring rod mounted for reciprocal movement in an aperture in the furnace wall from an extended position projecting into the interior of the furnace to a withdrawn position. Cyclic reciprocating movement is imparted to the rod by an actuating mechanism, mounted on the furnace wall and including a double acting fluid motor and a servomechanism. The actuating device includes an articulated mounting mechanism permitting the device to be positioned by pivotal movement about two mutually perpendicular axes whereby alignment difficulties on rebuilding the furnace wall are eliminated. Means are also provided for quickly disconnecting the servomechanism to facilitate manual positioning of the measuring rod.

6 Claims, 1 Drawing Figure

U.S. Patent   March 30, 1976   3,946,610
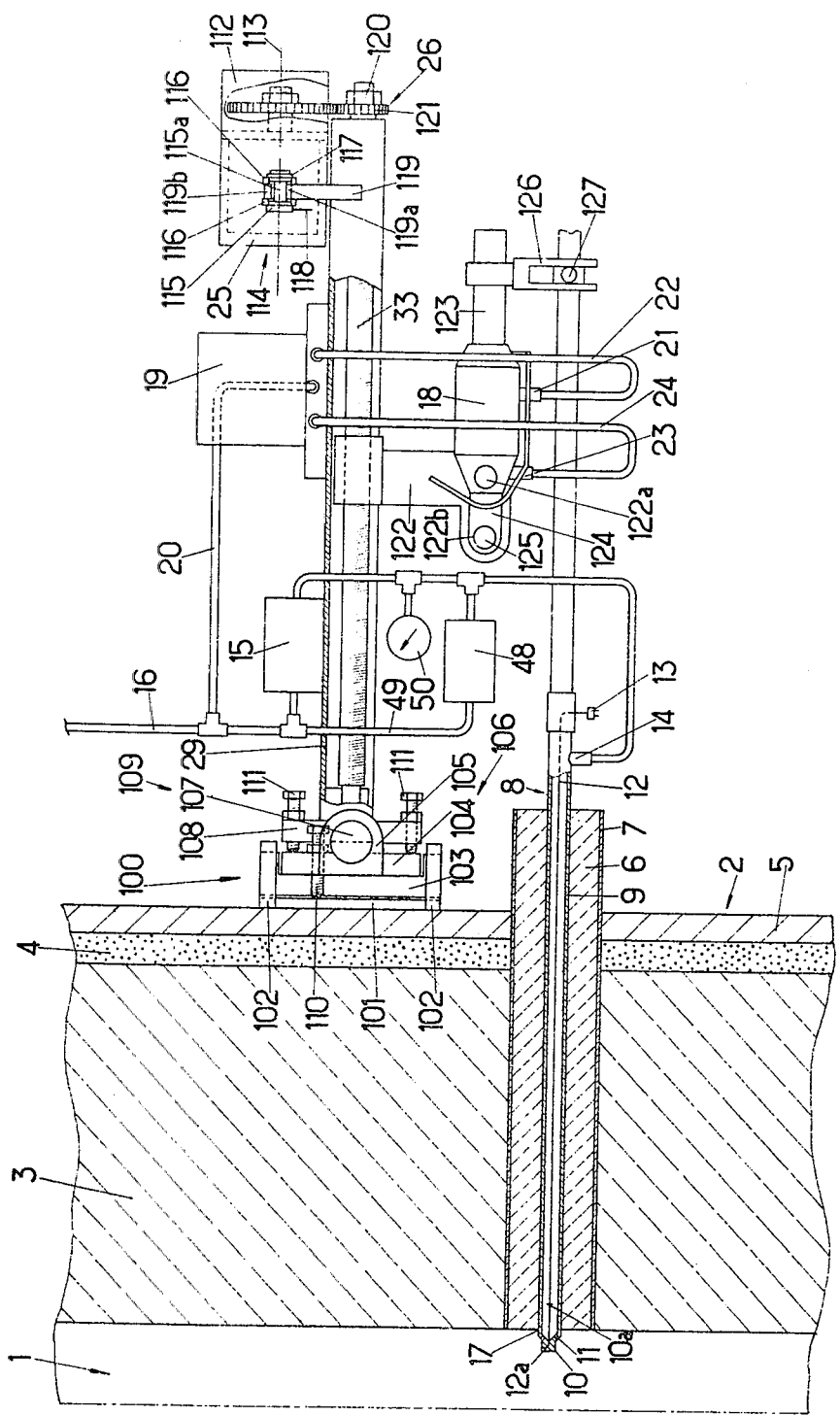

TEMPERATURE MEASURING DEVICE FOR METALLURGICAL FURNACES

CROSS REFERENCE TO RELATED APPLICATIONS

This is a continuation-in-part of my copending application Ser. No. 369,356, filed June 12, 1973.

BACKGROUND OF THE INVENTION

1. Field of the Invention

This invention relates to an improvement to apparatus for the continuous measurement of the temperature of metallurgical furnaces and more particularly to an improvement in said apparatus as disclosed in my copending U.S. patent application Ser. No. 369,356.

2. Description of the Prior Art

The invention according to my above-identified copending application, the disclosure of which is incorporated herein by reference, provides two embodiments of the mechanical means for performing the movements of the temperature measuring rod. In practice, however, it was found that problems arose with these two embodiments after rebuilding of the furnace, due to the fact that the automatic withdrawing device of the temperature-measuring rod was not always properly aligned with a fresh refractory tube. Nor could the servomotor be quickly disengaged for the manual adjustment of the longitudinal position of a fresh measuring rod, either after the rebuilding of the furnace or after the replacement of an accidentally damaged rod. The temperature measuring rod was not easy to demount. Such demounting during operation was a lengthy process and therefore caused unnecessary risks to the operators.

SUMMARY OF THE INVENTION

The measuring device according to the present invention uses means which obviate the aforementioned disadvantages. More particularly it comprises means which enable the measuring rod withdrawal device to be correctly aligned in relation to the refractory tube in the furnace wall.

The measuring device according to the invention is borne on the outside wall of the metallurgical furnace by an attaching device installed on such wall. The drive device of the temperature measuring rod is formed by a servomotor acting on an endless screw to displace the supporting yoke of a jack actuating the measuring rod sliding in a refractory tube in the furnace wall. The attaching device enables the drive device to be oriented parallel with the refractory tube.

The attaching device therefore comprises a first rotary element enabling the drive device to be rotated around a first, vertical pivot fixed in relation to the furnace wall, a second rotary element enabling the drive device to be rotated in relation to a second pivot which is disposed in the first rotary element and is at right angles to the first pivot, and means for immobilizing in rotation the first element in relation to the furnace wall and immobilizing in rotation the second element in relation to the first element.

A preferred embodiment of the attaching device comprises a first plate attached to the outside wall of the furnace and bearing a first assembly of two supporting plates in which a first vertical pivot is journaled, a second plate connected to the first vertical pivot and having a second assembly of two bearing plates in which a second horizontal pivot is journaled, and a third plate connected to the second horizontal pivot and supporting the drive device, means being provided to immobilize in rotation the third plate in relation to the second plate.

Also, according to the invention, the servomotor is mounted to so tilt in the drive device that the servomotor can be disengaged from the endless screw.

Also according to the invention, the way in which the jack rod is connected to the temperature measuring rod enables these two elements to be rapidly disengaged from one another. According to the invention, the jack rod bears a fork adapted to clamp a member disposed on the temperature measuring rod, the jack being mounted to so tilt around a pivot in its supporting yoke that the fork and the member on the temperature measuring rod can be disengaged.

BRIEF DESCRIPTION OF THE DRAWING

For the better understanding of the invention, a non-limitative embodiment of the invention will now be described by way of example with reference to the accompanying drawing, wherein:

The single drawing illustrates diagrammatically the mechanical part of an embodiment of the temperature measuring device according to the invention.

Like elements to those illustrated in the drawings of my above-identified copending patent application have like references in the accompanying drawing, but a detailed description of certain of these elements is omitted herein as not being necessary to the understanding of this invention.

The drawing shows more particularly a metallurgical furnace 1, its wall 2 including its steel outside wall 5. A temperature measuring rod 8 is guided in a refractory tube 6.

In the illustrated embodiments the pneumatic jack 18 has been inverted from the position illustrated in my copending application. An electric servomotor 25 acts, via gearing 26, on an endless screw 33. The measuring rod drive device is mounted on a bracket 29 supported by an attaching device 100 on the outside wall 5 of the furnace. An attachment plate 101 welded to the wall 5 has two first bearing plates 102 mounted thereon by screws (not shown).

Journaled in the bearing plates 102 is a vertical pivot member 103 whose central portion is milled as far as its diametrical plane. The vertical pivot 103 is connected to an intermediate plate 104 by screws (not shown). Two bearing plates 105 similar to the bearing plates 102 are connected to the intermediate plate 104. The pivot 103, the intermediate plate 104 and the bearing plates 105 form a first rotary element 106.

Journaled in the bearing plates 105 is a horizontal pivot member 107 whose central portion is milled as far as its diametrical plane. The horizontal pivot 107 is connected to a supporting plate 108 to which the bracket 29 is welded. The pivot 107, the supporting plate 108 and the bracket 29 form a second rotary element 109.

Two screws 110, disposed symmetrically in relation to the vertical pivot 103 and having lock nuts, are screwed inside the intermediate plate 104 and clamped against the attaching plate 101. The screws 110 immobilize in rotation the first rotary element 106 in relation to the furnace wall 5.

Two screws 111, having lock nuts and disposed symmetrically in relation to the pivot 107, are screwed into the supporting plate 108 and clamped against the intermediate plate 104. the screws 111 immobilize in rotation the second rotary element 109 in relation to the first rotary element 106.

A casing 112 contains the servomotor 25. The casing 112 is so mounted that it can rotate around a horizontal pivot 113 parallel with the endless screw 33. The pivot 113 is disposed on that surface of the casing 112 which is not shown.

The bolt 114, which is disposed on the visible surface of the casing, is shown closed. A pivot 115 extends through two lugs 116 welded on to the casing and is retained by a pin 117. The central portion of the pivot 115 is milled on both sides to form a narrow portion 115a and bears a lever 118 at one end.

A support 119 welded to the bracket 29 has an inner cylindrical portion 119a whose diameter is substantially equal to that of the pivot 115 and which is formed with an aperture 119b in its upper portion.

Turning the lever 118 by a quarter of a turn enables the narrow portion 115a of the pivot 115 of the bolt 114 to move into the aperture 119b. The casing 112 can then tilt, thus disengaging the gearing 26.

The position of the jack 18 can then be quickly adjusted manually by acting directly on nut 120, whose other function is to lock the pinion 121 in its position on the endless screw 33.

The supporting yoke 122 of the jack 18 comprises a pivot 122a around which the body of the jack 18 can tilt. At one end the jack 18 has a jack rod 123 and at the opposite end the lug 124 in which a locking rod 125 slides which is retained in the locking position by a spring (not shown), bearing against the lug 124 of the jack 18. The end of the locking rod 125 is normally engaged in a bore 122b in the supporting yoke 122, but it can be retracted so that the body of the jack 18 can be tilted upwards by the rod 123.

The upward tilting movement of the body of the jack 18 disengages the jack rod 123 from the temperature measuring rod 8, since the jack rod 123 bears a fork 126 cooperating during operation with an articulating member 127 connected to the end of the temperature measuring rod 8, and the upward movement of the body of the jack 18 lifts the fork 126, thus releasing the articulating member 127.

Clearly, various alterations, improvements or additions can be made to the embodiment just described, or certain of its elements can be replaced by equivalent elements, without altering the general economy of the invention.

What I claimed is:

1. A device for continuously measuring the temperature of a metallurgical furnace of the type which includes a drive device actuating a measuring rod sliding in a refractory guide tube in the furnace wall, and an attaching device installed on the outside wall of the furnace which supports the drive device and enables it to be oriented parallel with the refractory guide tube, the improvement wherein the attaching device comprises a first rotary element enabling the drive device to be rotated around a first, vertical pivot fixed in relation to the furnace wall, a second rotary element enabling the drive device to be rotated in relation to a second pivot which is disposed on the first rotary element and is at right angles to the first pivot, and means for immobilizing in rotation the first element in relation to the furnace wall and immobilizing in rotation the second element in relation to the first element.

2. A measuring device as set forth in claim 1, wherein the attaching device comprises a first plate attached to the outside wall of the furnace and bearing a first assembly of two supporting plates in which a first vertical pivot is journaled, a second plate connected to the first vertical pivot and having a second assembly of two bearing plates in which a second horizontal pivot is journaled, and a third plate connected to the second horizontal pivot and supporting the drive device, and means operable to immobilize in rotation the second plate in relation to the first plate and to immobilize in rotation the third plate in relation to the second plate.

3. The device as set forth in claim 1 wherein said drive device is a servo-motor acting on an endless screw to displace the supporting yoke of a jack actuating said measuring rod, said device further comprising mounting means supporting said servo-motor for tilting movement relative to said drive device whereby the servo-motor can be disengaged from the endless screw.

4. A temperature measuring device of the type including a drive device formed by a servomotor acting on an endless screw to displace the supporting yoke of a jack actuating a measuring rod sliding in a refractory guide tube in the furnace wall, the improvement wherein said jack includes a jack rod having mounted thereon a fork adapted to clamp a member disposed on the temperature measuring rod, and means mounting said jack for tilting movement around a pivot in its supporting yoke whereby the fork and the member on the temperature measuring rod can be disengaged.

5. a device for continuously measuring the temperature of a metallurgical furnace of the type which includes a drive device including a servomotor acting on an endless screw to displace the supporting yoke of a jack actuating a measuring rod sliding in a refractory guide tube in the furnace wall, and an attaching device installed on the outside wall of the furnace which supports the drive device and enables it to be oriented parallel with the refractory guide tube, the improvement wherein the attaching device comprises a first rotary element enabling the drive device to be rotated around a first, vertical pivot fixed in relation to the furnace wall, a second rotary element enabling the drive device to be rotated in relation to a second pivot which is disposed on the first rotary element and is at right angles to the first pivot, means for immobilizing in rotation the first element in relation to the furnace wall and immobilizing in rotation the second element in relation to the first element, said jack including a jack rod having mounted thereon a fork adapted to clamp a member disposed on the temperature measuring rod, and means mounting said jack for tilting movement around a pivot in its supporting yoke whereby the fork and the member on the temperature measuring rod can be disengaged.

6. the temperature measuring device as defined in claim 5 further comprising mounting means supporting said servomotor for tilting movement relative to said drive device whereby the servomotor can be disengaged from the endless screw.

* * * * *